US011951054B2

(12) United States Patent
Foster

(10) Patent No.: US 11,951,054 B2
(45) Date of Patent: Apr. 9, 2024

(54) HOSPITAL BED WITH FOOT EGRESS

(71) Applicant: Safe Harbor Hospital Beds, LLC, Greendale, IN (US)

(72) Inventor: Leslie Dale Foster, Greendale, IN (US)

(73) Assignee: Safe Harbor Hospital Beds, LLC, Greendale, IN (US)

( * ) Notice: Subject to any disclaimer, the term of this patent is extended or adjusted under 35 U.S.C. 154(b) by 0 days.

(21) Appl. No.: 18/233,934

(22) Filed: Aug. 15, 2023

(65) Prior Publication Data

US 2024/0024179 A1 Jan. 25, 2024

Related U.S. Application Data

(63) Continuation-in-part of application No. 17/966,058, filed on Oct. 14, 2022, now Pat. No. 11,759,380.

(60) Provisional application No. 63/302,342, filed on Jan. 24, 2022, provisional application No. 63/255,928, filed on Oct. 14, 2021.

(51) Int. Cl.

| | |
|---|---|
| ***A61G 7/053*** | (2006.01) |
| ***A61G 7/015*** | (2006.01) |
| ***A61G 7/075*** | (2006.01) |
| ***A61G 13/08*** | (2006.01) |
| ***A61G 13/12*** | (2006.01) |

(52) U.S. Cl.

CPC ............. *A61G 7/053* (2013.01); *A61G 7/015* (2013.01); *A61G 7/0755* (2013.01); *A61G 13/08* (2013.01); *A61G 13/125* (2013.01)

(58) Field of Classification Search

CPC ...... A61G 7/015; A61G 7/053; A61G 7/0755; A61G 7/16; A61G 13/08; A61G 13/1245; A61G 13/125; A47C 20/021; A47C 20/022

USPC ............................................ 5/619, 624, 648

See application file for complete search history.

(56) References Cited

U.S. PATENT DOCUMENTS 4,639,954 A * 2/1987 Speed .................... A61G 13/00 5/602
4,805,249 A * 2/1989 Usman ..................... A61G 7/00 5/604
4,894,876 A * 1/1990 Fenwick ............ A61G 13/0009 5/602
5,398,357 A * 3/1995 Foster .................... A61G 7/015 5/624
8,474,076 B2 * 7/2013 Hornbach ............ A61G 7/0755 5/624

(Continued)

*Primary Examiner* — Robert G Santos

(74) *Attorney, Agent, or Firm* — Ronald J. Richter; Nesbitt IP LLC

(57) ABSTRACT

A hospital bed having foot egress, including a foot section with a pair of foot panels that can pivot upward and be locked into place to provide a support structure for standing and ambulation Each of the pair of foot section panels can include a grab handle for assistance in standing. The foot end of the frame of the bed includes a retractable crossbar which supports the foot panels, and which can be reversibly retracted towards the middle of the bed frame and beneath the seat section of the bed to provide a clearing at the distal foot end of the bed for the patient to stand and exit the bed safely and efficiently. In one embodiment, the foot panels are each supported by their own support bar, each of which can be reversibly retracted laterally towards the lateral rails to expose the clearing.

18 Claims, 12 Drawing Sheets

(56) References Cited

U.S. PATENT DOCUMENTS

| | | | | |
|---|---|---|---|---|
| 8,615,827 | B2 * | 12/2013 | Newkirk | A61G 7/0755 5/619 |
| 11,052,005 | B2 * | 7/2021 | Childs | A61G 7/053 |
| 11,759,380 | B2 * | 9/2023 | Foster | A61G 7/16 5/619 |
| 2010/0223727 | A1 * | 9/2010 | Newkirk | A61G 7/0755 5/602 |
| 2012/0198629 | A1 * | 8/2012 | Hornbach | A61G 7/0755 5/624 |
| 2019/0083338 | A1 * | 3/2019 | Childs | A61G 5/006 |
| 2023/0157911 | A1 * | 5/2023 | Foster | A61G 7/16 5/619 |

* cited by examiner

HOSPITAL BED WITH FOOT EGRESS

CROSS-REFERENCE TO RELATED APPLICATION

The present application claims the benefit of pending U.S. application Ser. No. 17/966,058 filed Oct. 14, 2022, which claims the benefit of U.S. Provisional Application No. 63/302,342 filed Jan. 24, 2022, and U.S. Provisional Application No. 63/255,928, filed Oct. 14, 2021, the disclosures of which are incorporated herein by reference in their entirety.

FIELD OF THE INVENTION

The present invention relates in general to hospital beds, and more particularly to a hospital bed which can provide a clearing for egress from the foot end of the bed while providing support for standing and ambulation.

BACKGROUND OF THE INVENTION

Inpatient falls are a common and devastating complication of hospital care, particularly in elderly patients. Patients attempting to stand on their own often suffer slips, falls and serious injuries such as fractures and head trauma. It has been estimated that 700,000 to 1 million hospitalized patients fall each year, resulting in 250,000 injuries and up to 11,000 deaths. Patients in long-term care facilities are also at very high risk of falls, with approximately 1.3 million nursing home residents in the United States falling each year. Fall prevention measures such as alarm systems, nonslip socks or floors, sitters for keeping patients within line of sight, and lowering the bed height are all useful aspects of a fall prevention program; nevertheless, fall prevention remains the focus of intensive research efforts.

Patients are often required to sit up in bed prior to transferring to a wheelchair or walker, such as elderly or post-surgical patients. For example, a patient having undergone hip or knee replacement is typically urged to move from the bed to a walker on the same day of their surgical procedure; a typical goal for open heart patients is to be sitting up in a chair on the second day following surgery, and abdominal surgery patients are encouraged to be standing at the bedside the first day after surgery. Indeed, the ability to sit tip and stand on one's own is an important component of physical and/or occupational therapy, and often the patient will not be cleared to leave the hospital until they are able to exit the hospital bed unassisted.

While early ambulation is typically a goal for hospitalized patients, it may be a difficult task, since such movements can be painful and may cause dizziness or disorientation. Conventional hospital beds typically provide individualized support to the patient's head, torso, legs, and feet. Also, one or more sections of the bed may be able to be moved or re-oriented relative to another to facilitate patient mobility. Nevertheless, to sit up in a typical, conventional hospital bed, a supine patient must first re-orient their body by rolling to one side. The nurse can assist in raising the head of the bed, if needed, to get the patient's torso upright. The patient must then swing their feet around and drop their legs over the side of the bed, and in order to stand they must move their legs and feet away from the bed to bring their feet into contact with the floor. They must then support themselves on their legs, get balanced, and stand up out of the bed. This process can be painful and challenging, and unfortunately it is still common for patients to fall and injure themselves during the process, which increases the length of their hospital stay.

Hospital bed mechanisms for assistance in early ambulation are well known in the art, and may be electrically, hydraulically, and/or pneumatically operated. Some beds have been designed to assist patients in moving from a supine position to a sitting position and then to a standing position. However, while current hospital beds may provide several advantageous features and have generally performed well for their intended purposes, there remains a need for a hospital bed which can lower the risk of falls and reduce the pain of early ambulation while promoting improved patient mobility and safety.

SUMMARY OF TIE INVENTION

Accordingly, the present invention provides significant improvements to known hospital beds which can enable patients to move more easily from a supine position to a sitting position, and from the sitting position to a standing position, for the purpose of achieving the standing or walking position in a more efficient and less painful manner.

A first aspect of the invention provides a hospital bed having foot egress, the bed comprising: (a) a frame, the frame including a first lateral rail, a second lateral rail, and a retractable crossbar; and (b) a patient support surface supported by the frame, the support surface including: (i) a back section, (ii) a seat section, and (iii) a foot section, the foot section comprising a first foot panel and a second foot panel, the first foot panel being pivotably connected to the first lateral rail and the second foot panel being pivotably connected to the second lateral rail, wherein the retractable crossbar is reversibly movable along the opposing lateral rails between an extended position in which the crossbar is beneath the foot section and a retracted position in which the crossbar is beneath the seat section, wherein the first foot panel and second foot panel are each upwardly pivotable from a substantially co-planar relationship to a substantially parallel relationship, and wherein a clearing for egress from the bed is exposed when the retractable crossbar is in the retracted position and the first and second foot panels are in the substantially parallel relationship.

A second aspect of the invention provides a hospital bed with foot egress, the bed comprising: a frame including a first lateral rail, a second lateral rail, and a retractable crossbar; and a patient support surface coupled to the frame and including a foot section comprising a first foot panel and a second foot panel, wherein each of the first foot panel and the second foot panel include a grab handle for assistance in standing and ambulation, wherein the retractable crossbar is reversibly movable along the frame from an extended position beneath the foot section to a retracted position beneath the seat section, and wherein the first foot panel and the second foot panel are each upwardly pivotable relative to the seat section and away from one another to expose a clearing for egress from the bed.

A third aspect of the invention provides a hospital bed having foot egress, the bed comprising: a frame, the frame including a retractable crossbar movable along a first lateral rail and a second lateral rail, the lateral rails opposing one another; and a patient support surface supported by the frame, the support surface including a back section, a seat section, a thigh section, and a foot section, the foot section comprising a first foot panel and a second foot panel, the first foot panel being pivotably connected to the first lateral rail and the second foot panel being pivotably connected to the second lateral rail, wherein the retractable crossbar is reversibly movable along the opposing lateral rails between an extended position in which the crossbar is beneath the foot section and a retracted position in which the crossbar is beneath the thigh section, wherein each of the first foot panel and the second foot panel are upwardly pivotable from a substantially co-planar relationship to a substantially parallel relationship when the retractable crossbar is in the retracted position, wherein each of the first foot panel and the second foot panel include a grab handle for assistance in standing and ambulation and are configured to lock into place after being pivoted to the substantially parallel relationship, and wherein a clearing for egress from the bed is exposed when the retractable crossbar is in the retracted position and the first and second foot panels are in the substantially parallel relationship.

Another aspect of the invention provides an improved bed having foot egress, the bed comprising: a frame including a first lateral rail and a second lateral rail; a patient support surface supported by the frame, the support surface including: a back section; a seat section; and a foot section, the foot section comprising a first foot panel pivotably connected to the first lateral rail and a second foot panel pivotably connected to the second lateral rail, wherein the first foot panel and second foot panel are each upwardly pivotable through their connection with the first and second lateral rails, respectively, from a horizontal position in which the first and second foot panels are in a substantially co-planar relationship to a vertical position in which the first and second foot panels are in a substantially parallel relationship, and wherein a clearing for egress from the bed is exposed when the first foot panel and the second foot panel are in the vertical position; wherein the improvement comprises: a crossbeam connected perpendicularly between the first lateral rail and the second lateral rail of the frame, and located beneath the seat section of the patient support surface; a first support bar for supporting the first foot panel, the first support bar being slidably connected to the crossbeam for movement back and forth between the first lateral rail and the midline of the crossbeam, wherein movement of the first support bar towards the first lateral rail causes the first foot panel to lift and upwardly pivot to the vertical position, and wherein movement of the first support bar towards the midline of the crossbeam causes the first foot panel to pivot to the horizontal position; and a second support bar for supporting the second foot panel, the second support bar being slidably connected to the crossbeam for movement back and forth between the second lateral rail and the midline of the crossbeam, wherein movement of the second support bar towards the second lateral rail causes the second foot panel to lift and upwardly pivot to the vertical position, and wherein movement of the second support bar towards the midline of the crossbeam causes the second foot panel to pivot to the horizontal position.

Another aspect of the invention provides an improved bed having foot egress, the bed comprising: a frame including a first lateral rail and a second lateral rail; a patient support surface coupled to the frame and including a seat section and a foot section, the foot section comprising a first foot panel and a second foot panel, wherein each of the first foot panel and the second foot panel are pivotable from a horizontal position to a vertical position to expose a clearing for egress from the bed; a crossbeam connected perpendicularly between the first lateral rail and the second lateral rail, wherein the crossbeam is located beneath the seat section of the patient support surface; a first support bar for supporting the first foot panel, the first support bar being slidably connected to the crossbeam for movement between the first lateral rail and the midline of the crossbeam, wherein movement of the first support bar towards the first lateral rail causes the first foot panel to pivot to the vertical position, and wherein movement of the first support bar towards the midline of the crossbeam causes the first foot panel to pivot to the horizontal position; and a second support bar for supporting the second foot panel, the second support bar being slidably connected to the crossbeam for movement between the second lateral rail and the midline of the crossbeam, wherein movement of the second support bar towards the second lateral rail causes the second foot panel to upwardly pivot to the vertical position, and wherein movement of the second support bar towards the midline of the crossbeam causes the second foot panel to pivot to the horizontal position.

The nature and advantages of the present invention will be more fully appreciated from the following drawings, detailed description, and claims.

BRIEF DESCRIPTION OF THE DRAWINGS

The accompanying drawings illustrate the prior art and preferred embodiments of the invention and, together with a general description of the invention given above, and the detailed description given below, explain the principles of the invention.

DETAILED DESCRIPTION OF THE INVENTION

Figure 1:
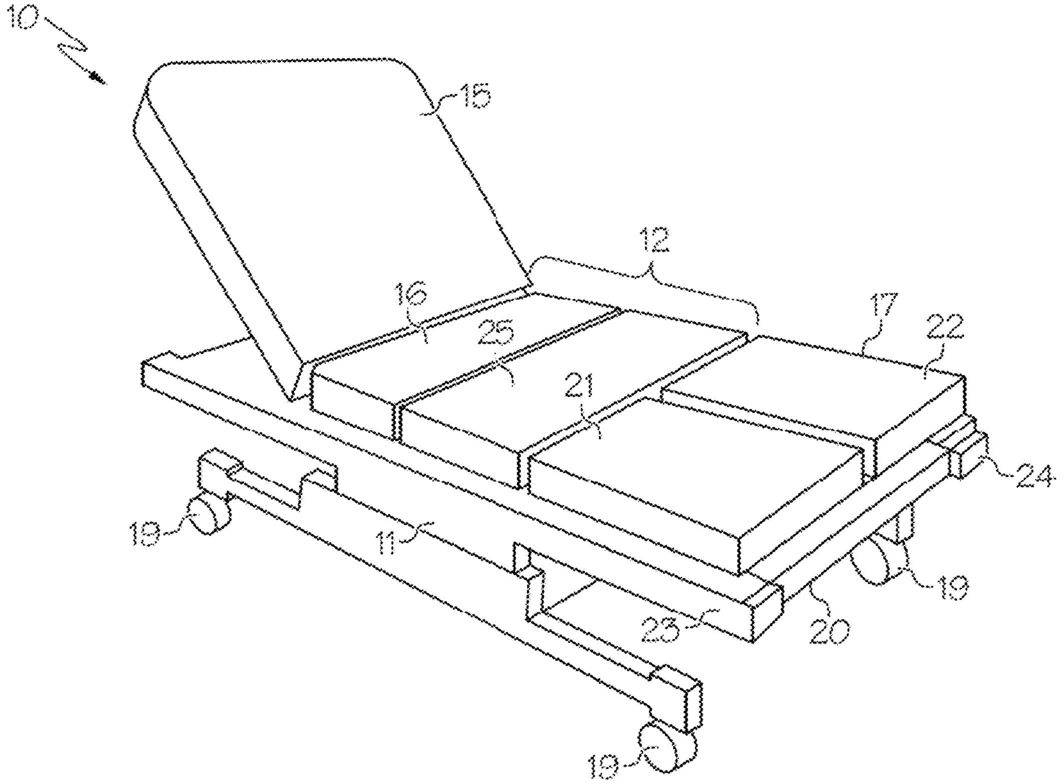
FIG. 1 illustrates a perspective view of one embodiment of a hospital bed according to the present invention.
Figure 2:
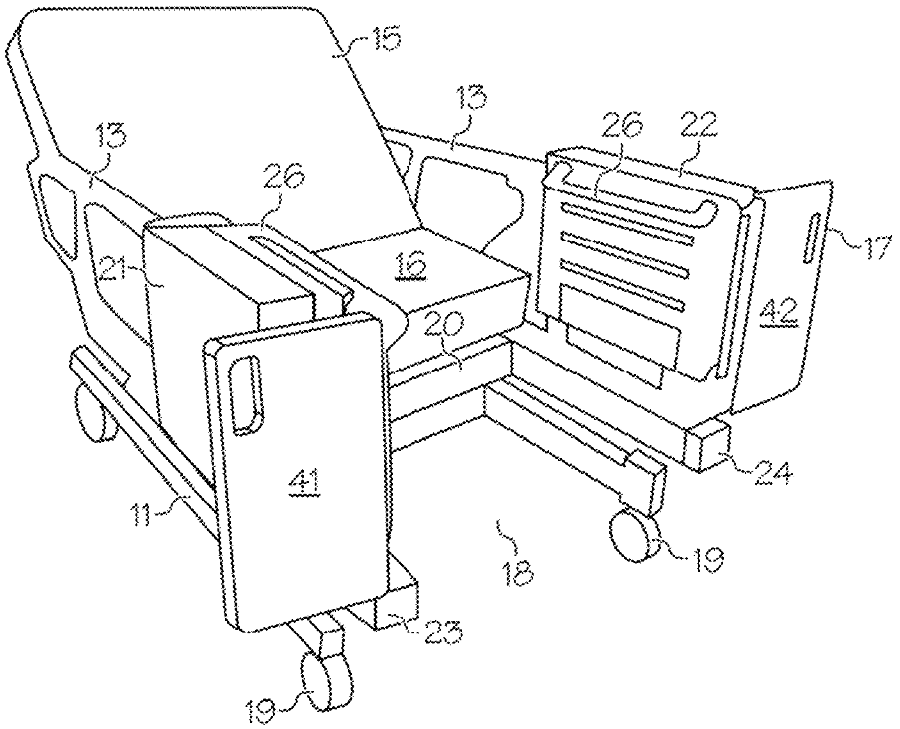
FIG. 2 illustrates a perspective view of a chair configuration of one embodiment of the hospital bed according to the present invention.

Referring initially to FIGS. 1 and 2, a hospital bed 10 according to the invention is shown including a base frame 11 and a patient support surface 12 mounted on the frame. Conventional guard rails 13 (or side rails, see FIG. 2) are typically located on each side of the back and/or seat sections 15, 16 of the bed, with a plurality of caster wheels 19 facilitating support and transportation. An intermediate frame (not shown) can also be supported by the base frame 11 and coupled to the patient support surface 12, as is known in the art. The patient support surface 12 is typically formed by a head/back section 15, a seat section 16, and a leg or foot section 17, which are mounted on the frame 11. A thigh section 25 can also be included, as is known in the art, for example, as part of the patient support surface 12 adjacent the seat section 16. The seat section 16 may be rigidly mounted to the frame 11 to prevent movement therebetween, while the thigh section 25 can be pivotably coupled or otherwise mobile.

In contrast, the foot section 17 is typically not pivotably attached to the adjacent seat section 16 (or the thigh section 25, if present), and instead includes a first foot panel 21 and a second foot panel 22, both of which are pivotably mounted on opposing first and second lateral rails 23, 24 at the foot end of the frame 11, with the first foot panel 21 being pivotably connected to the first lateral rail 23 and the second foot panel 22 being pivotably connected to the second lateral rail 24 at the foot end of the frame 11. Each of the foot panels 21, 22 are movable relative to the other, and they are also movable relative to the seat section 16, so that the foot section 17 of the bed can be "opened" as shown in FIG. 2 to provide a clearing 18 for the patient to stand and to exit from the foot of the bed efficiently and safely.

For the purposes of the present invention, the patient support surface 12 of the hospital bed can include either three or four sections, so long as there is the foot section 17, as described herein. The various sections 15, 16, 17, 25 of the patient support surface 12 can each include conventional molded foam pads or mattresses to provide a suitable soft, yet supportive surface upon which a patient can rest. Likewise, the foot section 17 including the first foot panel 21 and the second foot panel 22, can also be capped or topped with a molded foam pad or mattress. Fitted sheets can cover each of the various support surface sections, and when soiled or dirty they can be easily removed and replaced by the hospital staff.

The inventive hospital bed 10 can be converted between a bed configuration and a chair configuration. When in the bed configuration as shown in FIG. 1, the back section 15, the seat section 16, the thigh section 25, and each of the panels 21, 22 of the foot section 17 can cooperate to support the patient in a flat or supine position. In this configuration the patient is supported while laying flat on their back, and the foot section panels 21, 22 are oriented side by side and co-planar with the seat section 16 and with one another, to support the patient in a laying position. Typically the back section 15 may also be pivoted or positioned in relation to the seat section 16 to either allow the patient to lay completely flat, as well as to allow the patient to sit upright, for example in a standard Fowler's position.

Conversely, when the patient support surface 12 is utilized in a chair configuration, as shown in FIG. 2, the foot panels 21, 22 are pivoted upward and outward from their co-planar position on the frame 11 to assume a substantially parallel relationship, and revealing the space or clearing 18 at the foot of the bed for egress. In this configuration the foot panels 21, 22 no longer define part of the patient support surface 12, which now includes only the head/back section 15, the seat section 16, and the thigh section 25 (if present).

In addition to the guard rails 13, FIG. 2 also illustrates the inventive bed having footboards 41, 42 connected to each foot panel 21, 22, respectively. Like conventional guard rails 13, the footboards 41, 42 are also typically present on conventional hospital beds as well as the inventive bed, but were not illustrated in the embodiment shown in FIG. 1 in order to permit a better view of the various sections 15, 16, 25, 17 of the bed, as well as the retractable crossbar 20 which slides along the pair of lateral rails 23, 24 of the frame 11. Operation of the crossbar 20 will be explained in more detail below. Footboards have been found to be useful for patients with limited strength or mobility who may slide down in the bed because of gravity, or who may have difficulties sitting upright for a longer period of time. Footboards also discourage visitors from sitting on the end of the bed, which can cause the bed to tip. For the purposes of the present invention, the foot section 17 of the hospital bed can either include the footboards 41, 42 or not include footboards; typically patients and nurses prefer having them present.

As can be seen from comparing FIG. 1 to FIG. 2, the panels 21, 22 and their respective footboards 41, 42 can be pivoted from a substantially co-planar relationship (FIG. 1) to a relationship in which the first foot panel 21 and the second foot panel 22 are substantially upright/vertical and parallel to one another (FIG. 2). Looking at FIG. 2, the panels 21, 22 with their footboards 41, 42 are pivoted upward and outward via their pivotal connection with the lateral rails 23, 24 of the frame. Once in a substantially vertical position to expose the clearing 18 for the patient to stand, the panels 21, 22 can be locked into place and can provide a stable support which includes grab handles 26 for the patient to use when attempting to stand up. Those having ordinary skill in the art will appreciate that the grab handles 26 can be of any suitable shape, configuration, or arrangement sufficient to promote patient ambulation from the seated position.

The undersides of the panels 21, 22 can include integrated heel supports (not shown) which can advantageously allow for comfortable placement and securement of the patient's feet when the panels 21, 22 are in the raised or vertical configuration, i.e. the substantially parallel relationship. Heel supports are known in the art for use as stirrups for exposing the patient's groin area for cleaning, and/or positioning the patient for urinary catheterization, if needed. In addition, heel supports can be useful for comfortably holding the supine patient's feet and maneuvering their legs while moving the foot panels between the open and closed positions. The inclusion of heel supports in the inventive foot panels provides another advantageous use for the present invention, in addition to providing a safe clearing for standing and egress from the bed.

Figure 3:
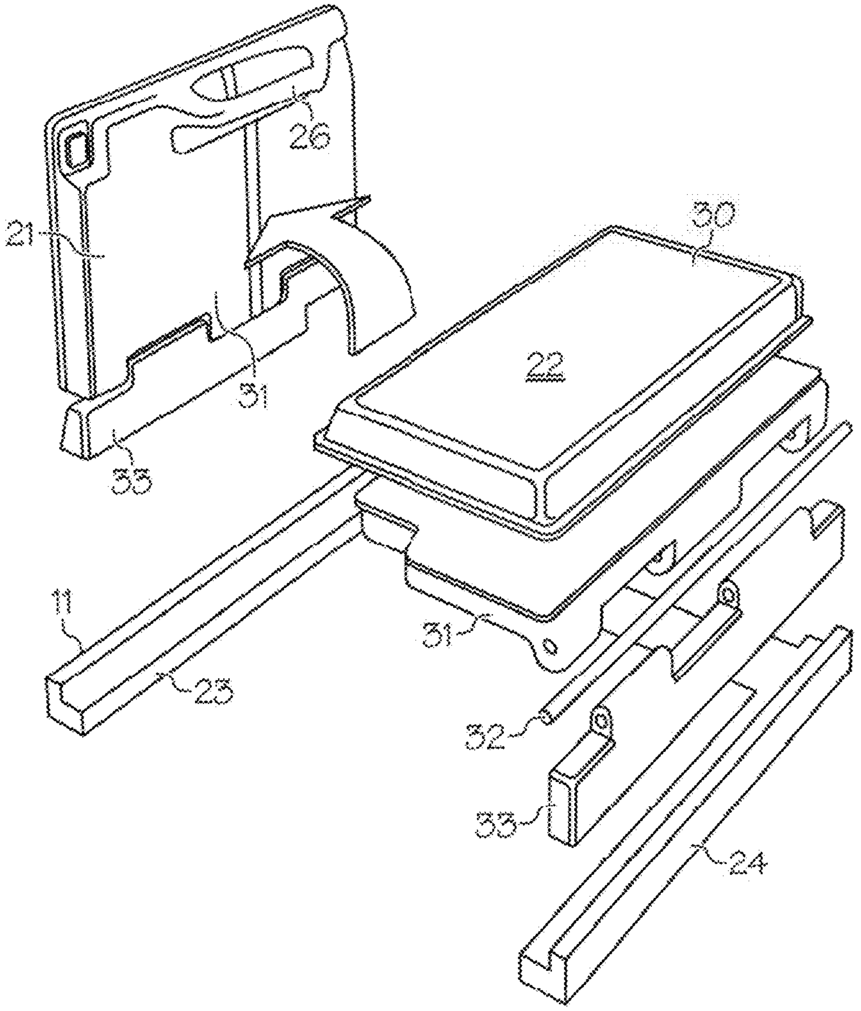
FIG. 3 illustrates a perspective and an exploded view of one embodiment of one of the foot panels of the hospital bed according to the present invention.

As shown in FIG. 3, the first foot panel 21 and the second foot panel 22 can be pivotably connected to the two opposing lateral rails 23, 24 at the foot end of the frame 11, each panel being pivotably attached to one of the rails 23, 24 by a pin 32 or other suitable pivoting mechanism known in the art. An exploded view of panel 22 in FIG. 3 shows one embodiment of the panel for use with the present invention, the panel 22 including a top mattress cap 30 and a hinged mechanism including an upper hinge knuckle 31, a pin 32, and a lower hinge knuckle 33. Each lower hinge knuckle 33 can attach to an opposing lateral rail 23, 24 of the frame and allow its panel to pivot upward relative to the seat section 16 as it rotates about the pin 32, the distal/inner portions of the previously co-planar panels 21, 22 moving upward and outward, away from one another, thus exposing the clearing 18 (when the crossbar 20 is retracted) for safe egress from the bed. The hinged mechanism can be designed such that the panel (21, as shown) can lock into place after being moved to a position in which the panels are substantially vertical. When both panels 21, 22 are vertical and locked they are also substantially parallel to one another, as can be seen in FIG. 2.

Figure 4A:
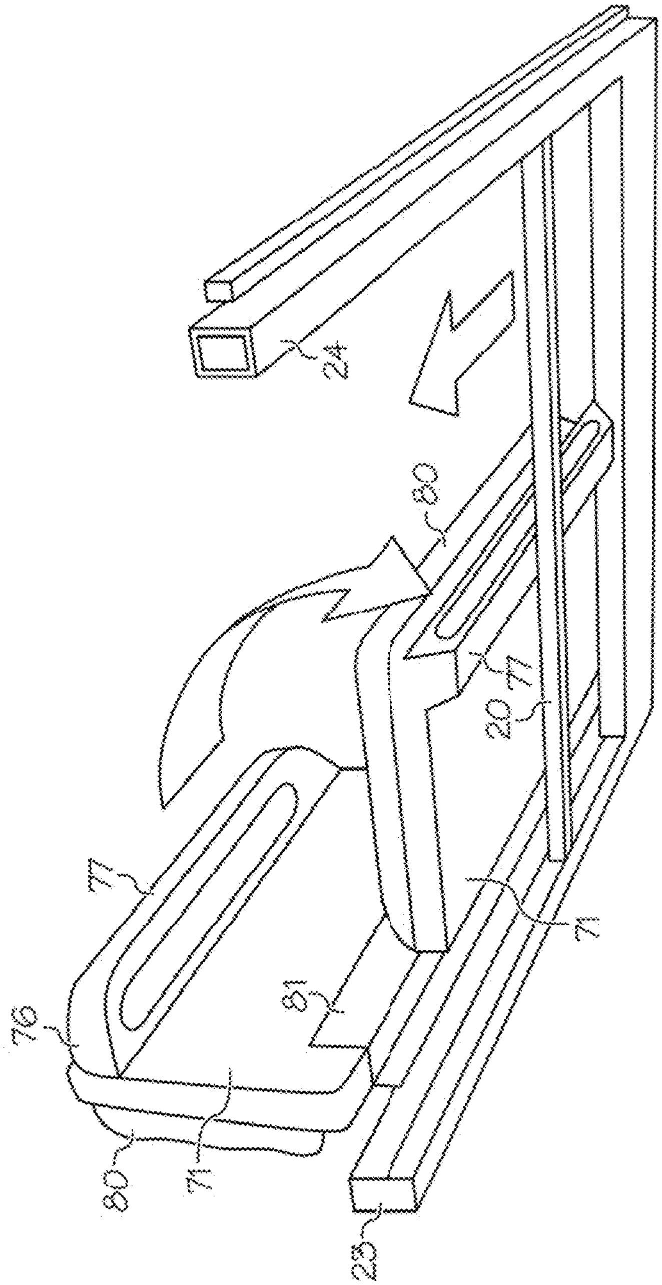
FIGS. 4A-4C illustrate various views of another embodiment of the foot panels of the hospital bed according to the present invention.
Figure 4C:
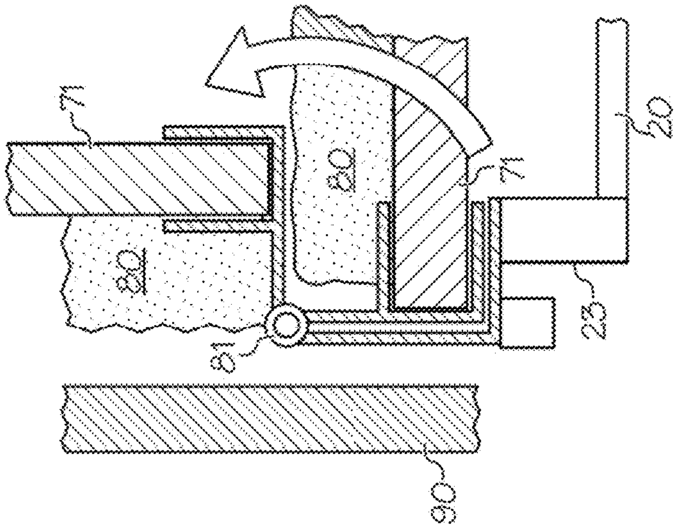
Figure 4B:
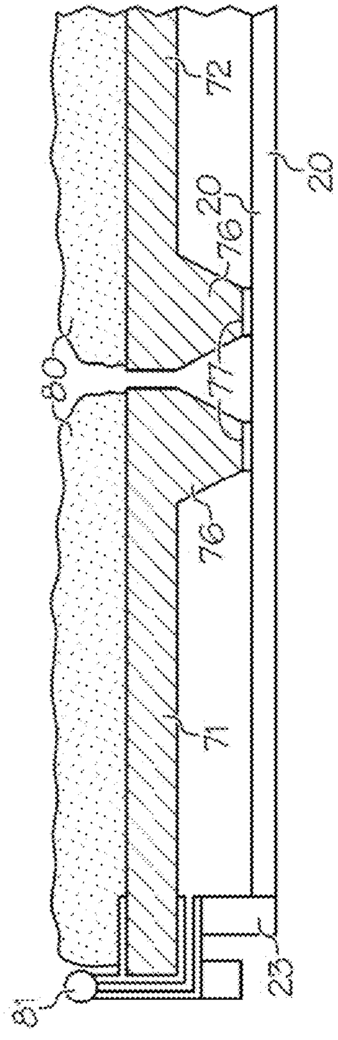

FIGS. 4A-4C illustrate another embodiment of the panels 71, 72 for use with the present invention. FIG. 4A shows an off-set pivot hinge 81 which is used to pivotably attach the panel 71 to the lateral rail 23. This off-set pivoting motion 82 swings the panel 71 and its foam top mattress cap 80 from a horizontal and/or substantially co-planar relationship with its mating panel 72 (see FIG. 4B) to a substantially vertical position (see FIG. 4C), to expose the clearing for the patient to stand. Once in this vertical position, as best seen in FIG. 4A, the panel 71 can provide a stable support which includes a grab handle 76 for the patient to use when attempting to stand up. Looking at FIG. 413, when the panels 71, 72 are in a co-planar relationship (i.e. the bed configuration, as described above), the grab handles 76 are seated between the panels 71, 72 and the crossbar 20. Each of the grab handles 76 can include a slide bearing edge 77 as shown in FIG. 4B, which protects the handle 76 from wear and tear due the sliding of the crossbar 20 beneath it. Sliding movement of the crossbar 20 will be explained in more detail below.

FIG. 4C is a close-up view of the off-set pivot hinge of FIG. 4A in relation to a conventional hospital bed guard rail 90. It can be appreciated upon viewing FIG. 4C that the movement of the panel 71 from the horizontal position to the vertical position, as shown by the upward direction of the arrow, does not change the lateral profile of the bed. That is, raising of the panel does not cause any interference with the guard rail 90 on the outside of the bed. As a result, the panels 71, 72 can be raised to their upright, substantially parallel position without the guard rail 90 being blocked by the upright panels, thereby allowing the patient to use both the guard rails 90 as well as the grab handles 76, if needed. The downward curved arrow of FIG. 4A illustrates movement of the panel 71 from the vertical position to the horizontal position, causing the bearing edges 77 of the grab handles 76 to once again make contact the movable crossbar 20.

The retractable crossbar 20 disclosed herein is reversibly movable along the frame of the bed from an extended position under the foot section of the patient support surface to a retracted position beneath the seat section. Retraction of the crossbar 20 towards the center of the bed frame is necessary prior to or during the upward pivoting of the foot panels, to provide a safe clearing 18 for standing and egress from the foot end of the bed. Otherwise, the patient could easily injure themselves on the crossbar if it were not retracted. The retractable crossbar can be caused to move manually or by electronic-, hydraulic-, or pneumatic-operated means.

Figure 5:
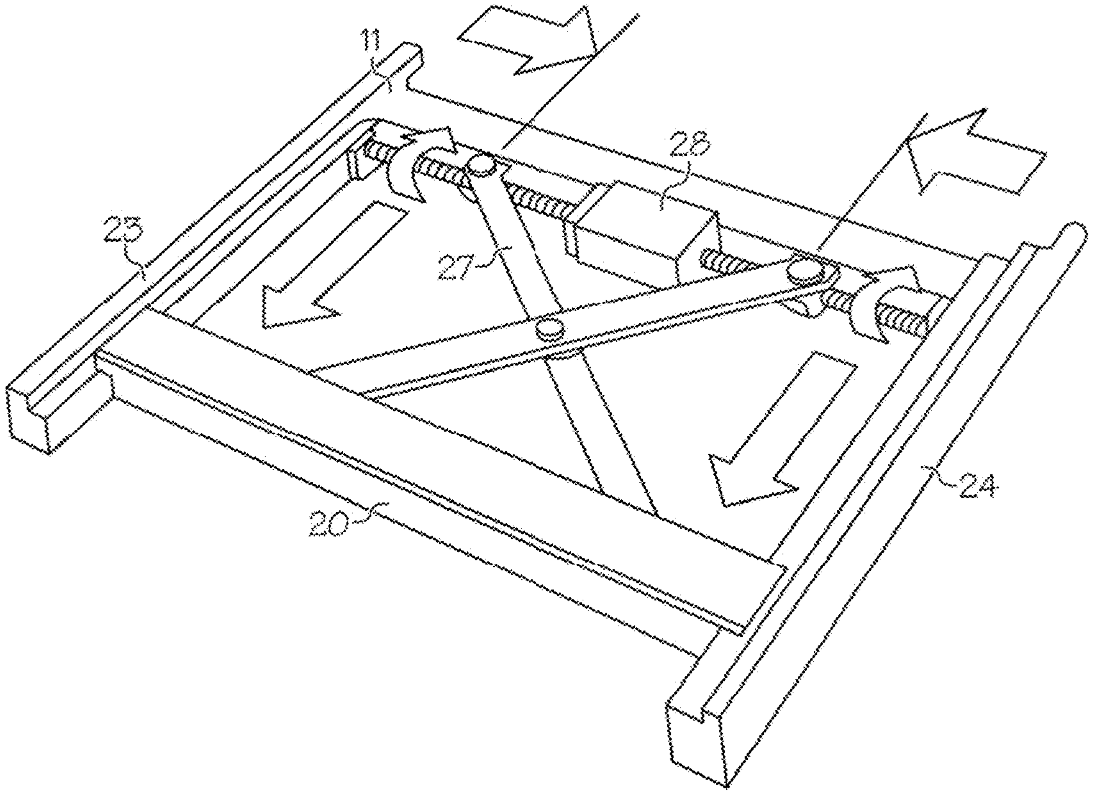
FIG. 5 illustrates one embodiment of a retracting means for the retractable crossbar.

FIG. 5 illustrates one embodiment of a relatively simple retracting means 27 for the crossbar 20. When in the extended position, the crossbar 20 is positioned beneath the foot section 17 of the support surface, at the distal foot end of the frame 11 to provide frame support for the foot panels and the patient's feet, i.e. when the patient is lying supine (see FIG. 1). The crossbar 20 can be drawn inward and become situated beneath the seat section 16 of the patient support surface (compare crossbar 20 location in FIG. 1 to FIG. 2). The retracting means 27 illustrated in FIG. 5 can be operated by an actuation mechanism 28, for reversibly moving the crossbar 20 inward and outward along the lateral rails 23, 24 of the frame 11. As a non-limiting example, if the actuation mechanism 28 is a small electrically powered motor, typically the motor can activate the retracting means 27 so that the crossbar 20 can be reversibly withdrawn or retracted beneath the seat section to create the clearing within about 4 seconds. Upon upward rotation and "opening" of the foot panels as described above the clearing is exposed, providing an easily accessible outlet for exiting the bed.

Figure 6:
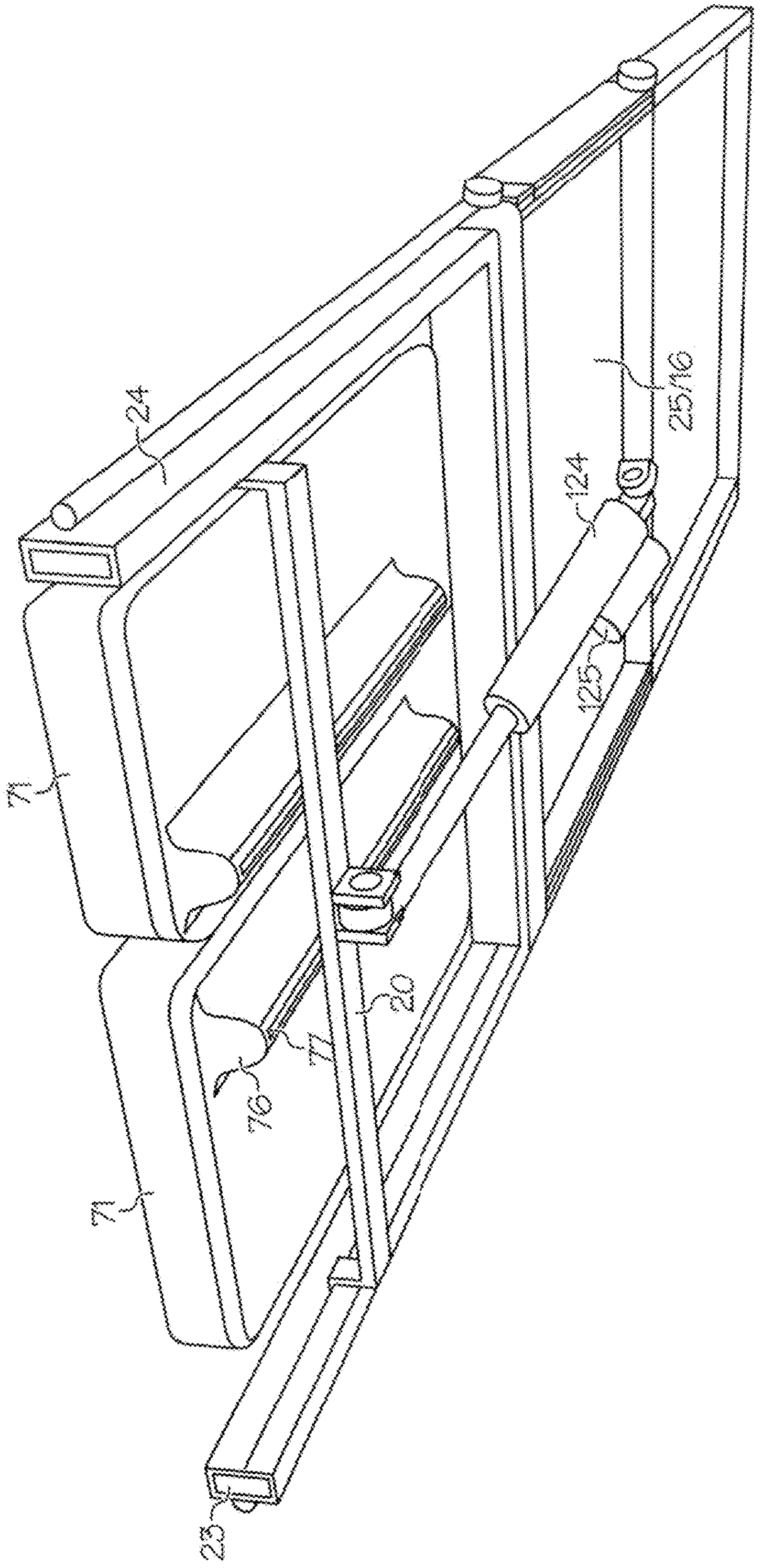
FIG. 6 illustrates another embodiment of the retracting means for the retractable crossbar in the form of an extension rod operated by a linear actuator.

FIG. 6 illustrates an embodiment of the retracting means in the form of an extension rod 124 which can be operated by a linear actuator 125, again such as a small motor, for reversibly moving the crossbar 20 inward and outward. The crossbar 20 is shown partially extended, as it slides along the lateral rails 23, 24 and beneath the bearing edges 77 of the grab handles 76. As noted above, the bearing edges 77 are intended to protect the grab handles 76 from wear and tear as they make contact with the frequently moving crossbar 20. The extension rod 124, activated by the linear actuator 125, can withdraw the crossbar 20 towards the center of the bed to expose the clearing. The panels 71, 72 can then be rotated upward and outward via their connection with the lateral rails 23, 24, being pivoted from a co-planar position as shown in FIG. 6 to a substantially parallel relationship as described herein, i.e. in an upright, vertical position, to expose the clearing.

Another embodiment of the retracting means (not shown) can be in the form of a linkage system which can be operated by a pair of actuators, for example, small motors which can reversibly move the crossbar inward and outward. Once the linkage system, activated by the small motors, has withdrawn the crossbar towards the center of the bed, the panels can be rotated upward and outward via their connection with the lateral rails from a co-planar position to a substantially parallel relationship to expose the clearing.

For safety purposes, the foot panels of the foot section can typically include a retention mechanism (not shown) which maintains the panels in a "closed", locked position, in co-planar abutment with each other and with the seat section (or the thigh section, if present), as is seen in the bed configuration. That is, when the foot panels are closed, a safety feature of the bed can include locking of the foot panels into this position and only permitting opening of the panels after the crossbar has been fully withdrawn into its retracted, stored position under the seat section of the bed. Therefore, the pair of foot panels should only be pivotable to reveal the clearing, and only pivotable in an upward direction, after the crossbar has first been fully retracted. As noted above, if the panels are opened before the crossbar has been retracted, then the patient could trip over the crossbar and be injured due to the crossbar blocking the path to egress. Also, it is important for safety reasons that the crossbar be in the fully extended position at the end of the frame when in the bed configuration. This is necessary to provide frame support for the patient's feet when lying supine, as well as support for a visitor who may choose to sit on the end of the bed (e.g. if there are no footboards). Once the crossbar is fully retracted, the foot panels can be upwardly pivoted to a substantially parallel relationship and locked into place to expose the clearing for standing and ambulation. The grab handles of the foot panels can now be accessed by the patient and used for support in standing.

Figure 7:
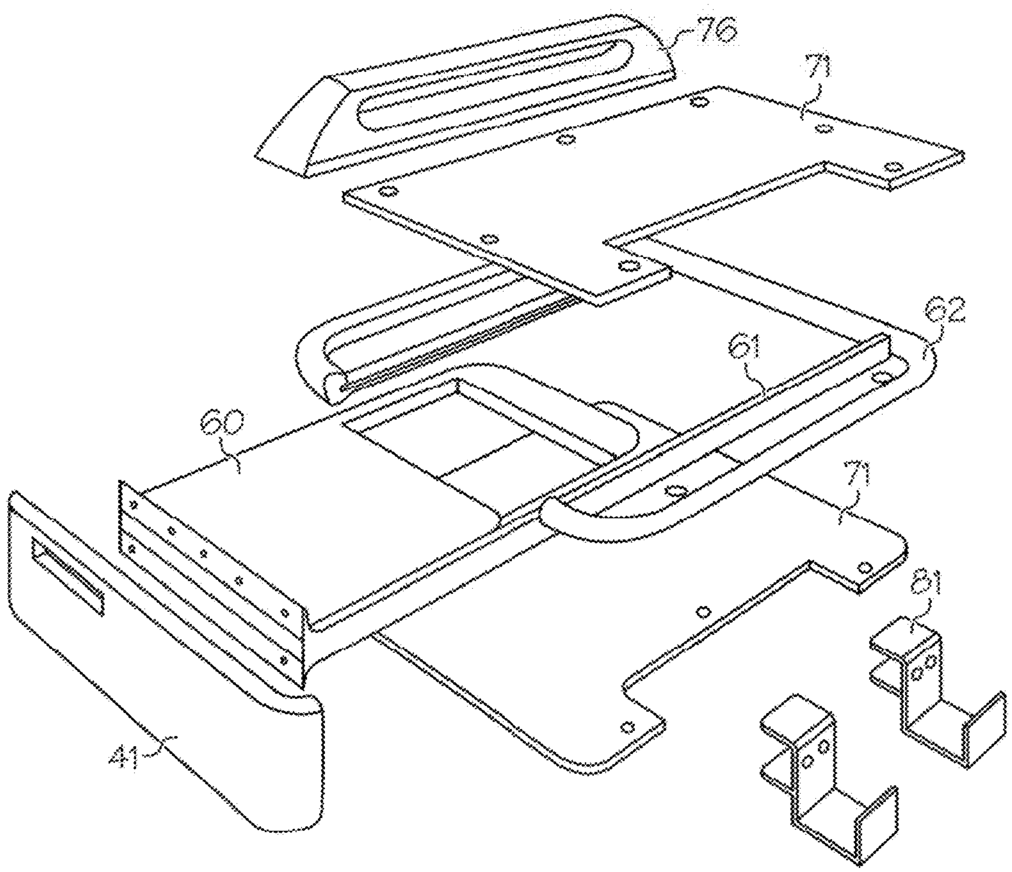
FIG. 7 illustrates an embodiment of one of the foot panels which includes a length extension assembly for tall patients.

FIG. 7 illustrates a length extension assembly 60 configured to adjust the foot section of the inventive bed between a first length and a second length, for tall patients. An exploded view of a foot panel 71 such as that shown if FIGS. 4A-4C further includes a deck extension assembly 60 located between top and bottom plates 71 of the panel. The deck extension assembly 60 can be moved with respect to the panel's plates 71 through actuation of a release handle (not shown), which allows the assembly 60 to slide along rails 61 which are slidably secured between supportive fittings 62 connecting the panel plates 71. Once released, the deck extension assembly 60 can be moved to its second length by pulling the footboard 41 out and sliding the assembly along the rails 61. This adjustment of the deck length provides for the accommodation of patients whose height necessitates a longer patient support.

In the development of alternative embodiments, discussed below, the inventor was concerned that, following retraction of the crossbar 20, the foot panels 21, 22 would be unsupported from beneath, prior to being rotated upward. For example, looking at FIG. 2, after retracting the crossbar 20, the first foot panel 21 and the second foot panel 22 are vulnerable, for example, to any weight being placed on them from above. Specifically, it can be appreciated that if someone were to sit on the second foot panel 22 prior to upwardly rotating it to the raised, vertical position, it would be unsupported by the crossbar 20 and could give way, with possible subsequent injury to the patient, or damage to the foot panels. As a result, an embodiment has been envisioned in which each of the foot panels can be supported by their own, dedicated support bar, and where coordinated movement of the support bars can reversibly raise and lower their related foot panels in a safe and easy manner.

While the embodiment described below and illustrated in FIGS. 8-12 includes novel improvements over the embodiments described above, the new illustrations may not show the entire hospital bed; rather, the new figures focus on novel disclosure of the foot section 17 of the bed. Nevertheless, it can be assumed that the inventive bed of FIGS. 8-12 includes the same following elements as the embodiments shown in FIGS. 1-7 and described above: a base frame 11 and a patient support surface 12 mounted on the frame, conventional guard rails 13 (or side rails, see FIG. 2), with a plurality of caster wheels 19 facilitating support and transportation. The patient support surface 12 is typically formed by a head/back section 15, a seat section 16, and a leg or foot section 17, which are mounted on the frame 11. The seat section 16 may be rigidly mounted to the frame II to prevent movement therebetween, while the foot section 17 includes a first foot panel 21 and a second foot panel 22, both of which are pivotably mounted on opposing first and second lateral rails 23, 24 at the foot end of the frame 11 so that they can be rotated upward, with the first foot panel 21 being pivotably connected to the first lateral rail 23 and the second foot panel 22 being pivotably connected to the second lateral rail 24 at the foot end of the frame 11. Each of the foot panels 21, 22 are movable relative to the other, and they are also movable relative to the seat section 16, so that the foot section 17 of the bed can be "opened" to provide a "safe harbor" clearing 18 for the patient to stand and to exit from the foot of the bed efficiently and safely.

Figure 8:
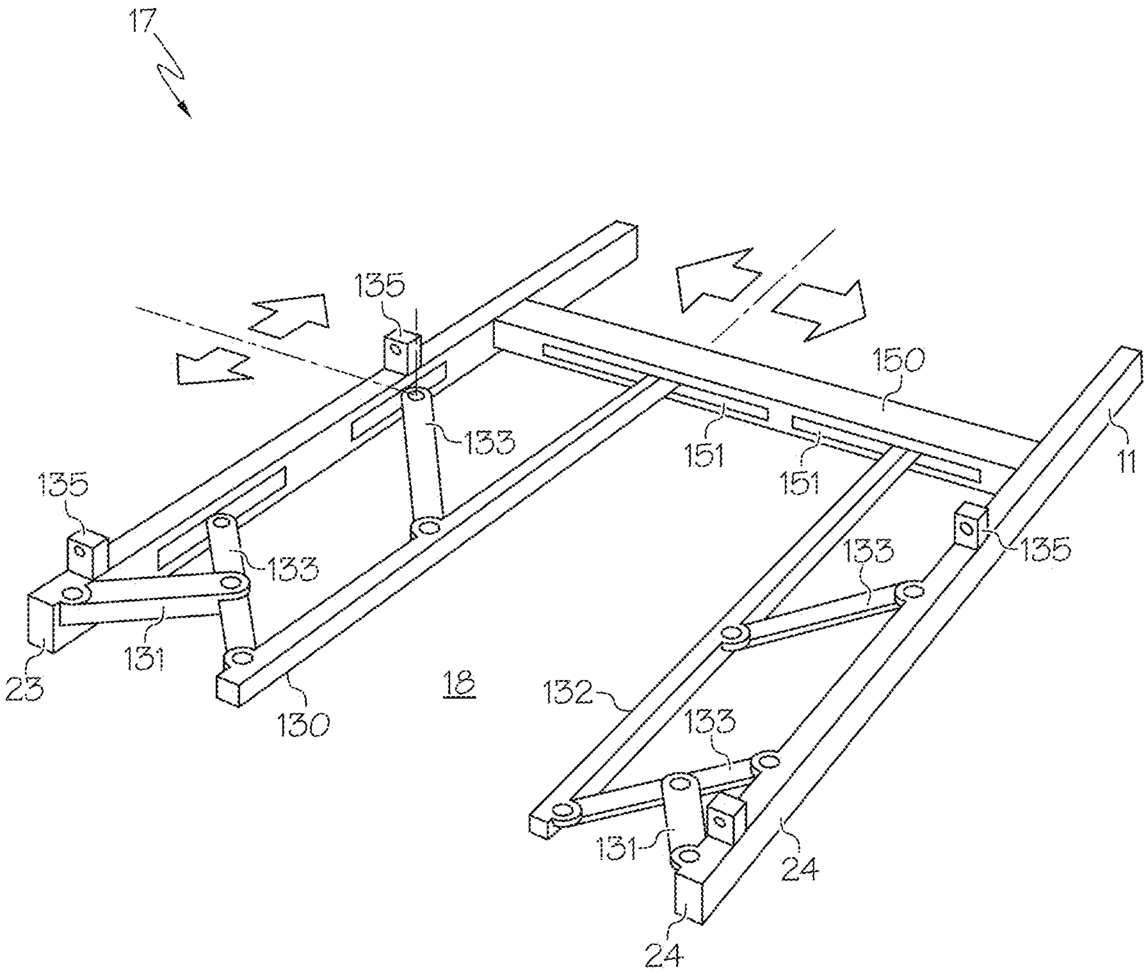
FIG. 8 illustrates an embodiment of the foot section of the bed with dual support bars and a crossbeam.
Figure 9:
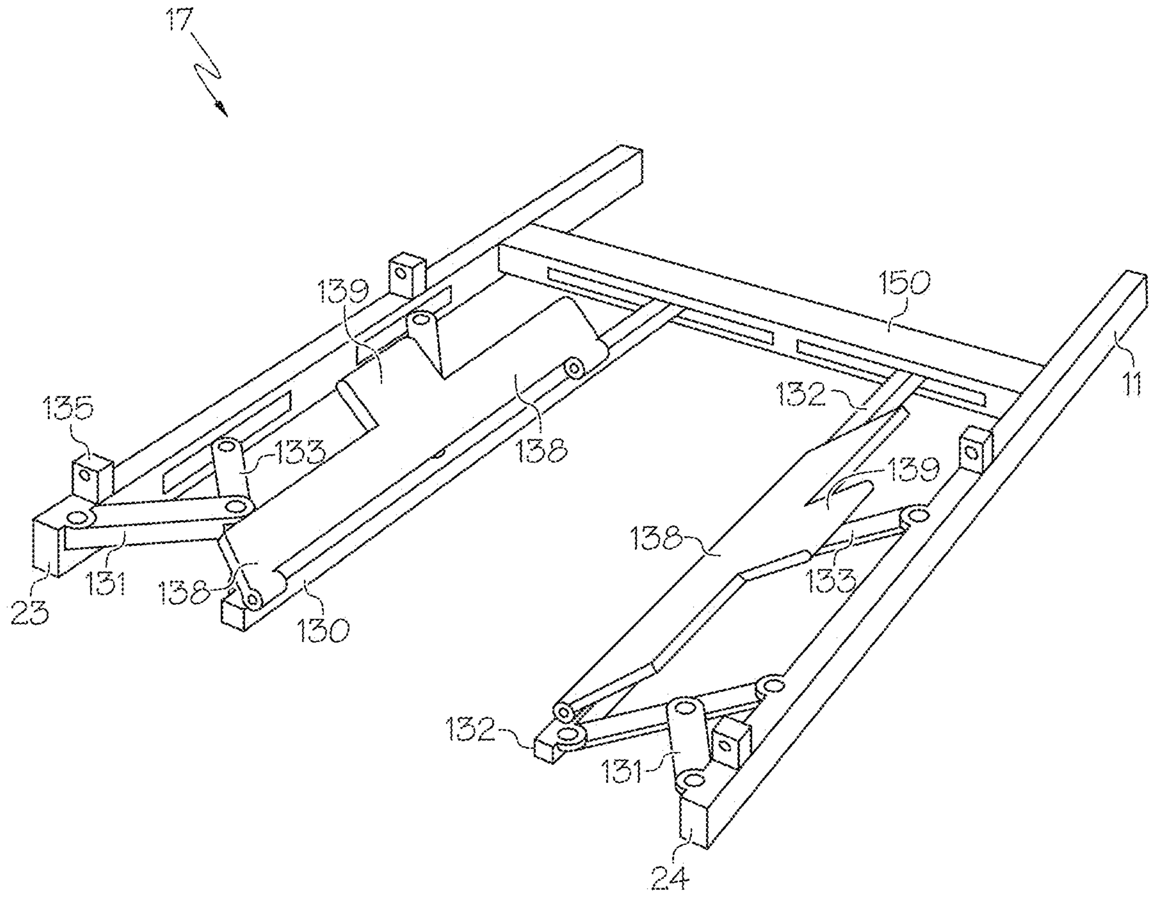
FIG. 9 illustrates a pair of lifting segments added in the embodiment of FIG. 8.
Figure 10:
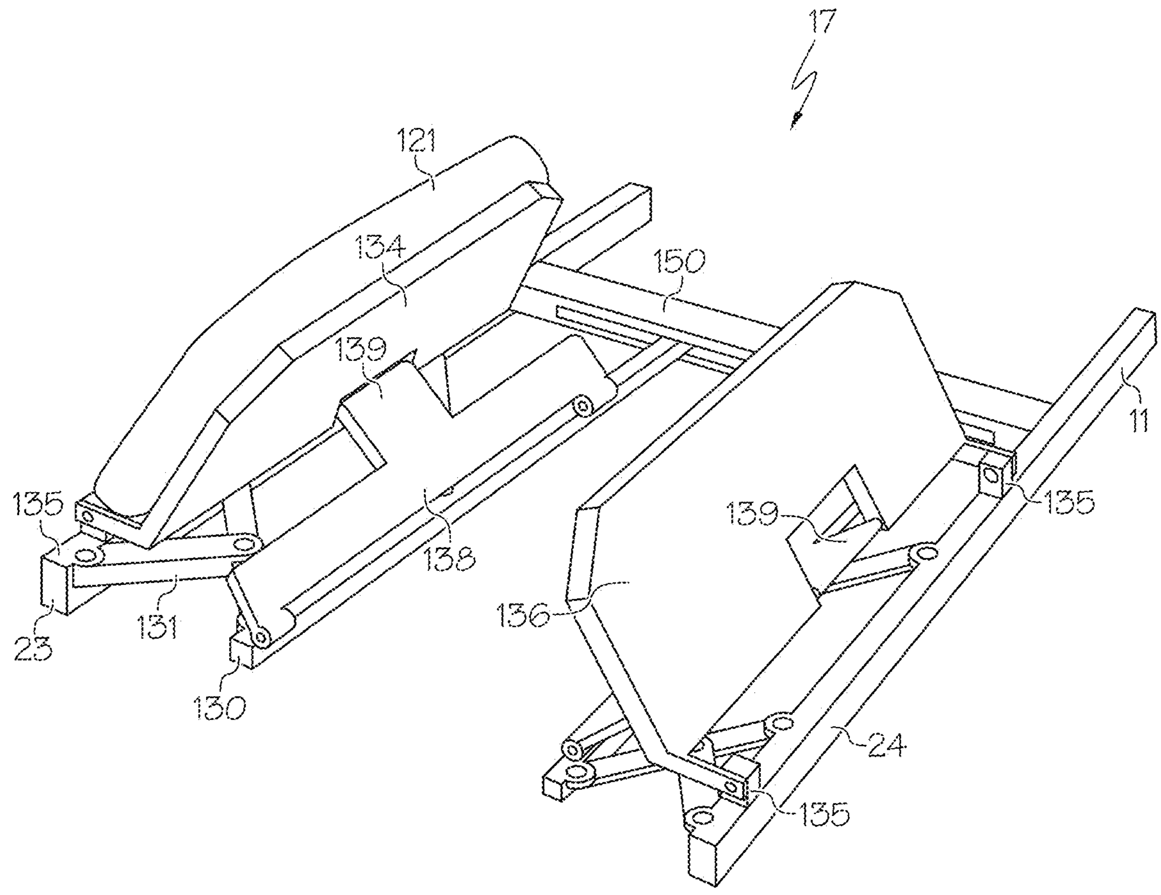
FIG. 10 illustrates a pair of deck portions added in the embodiment of FIG. 8.
Figure 11:
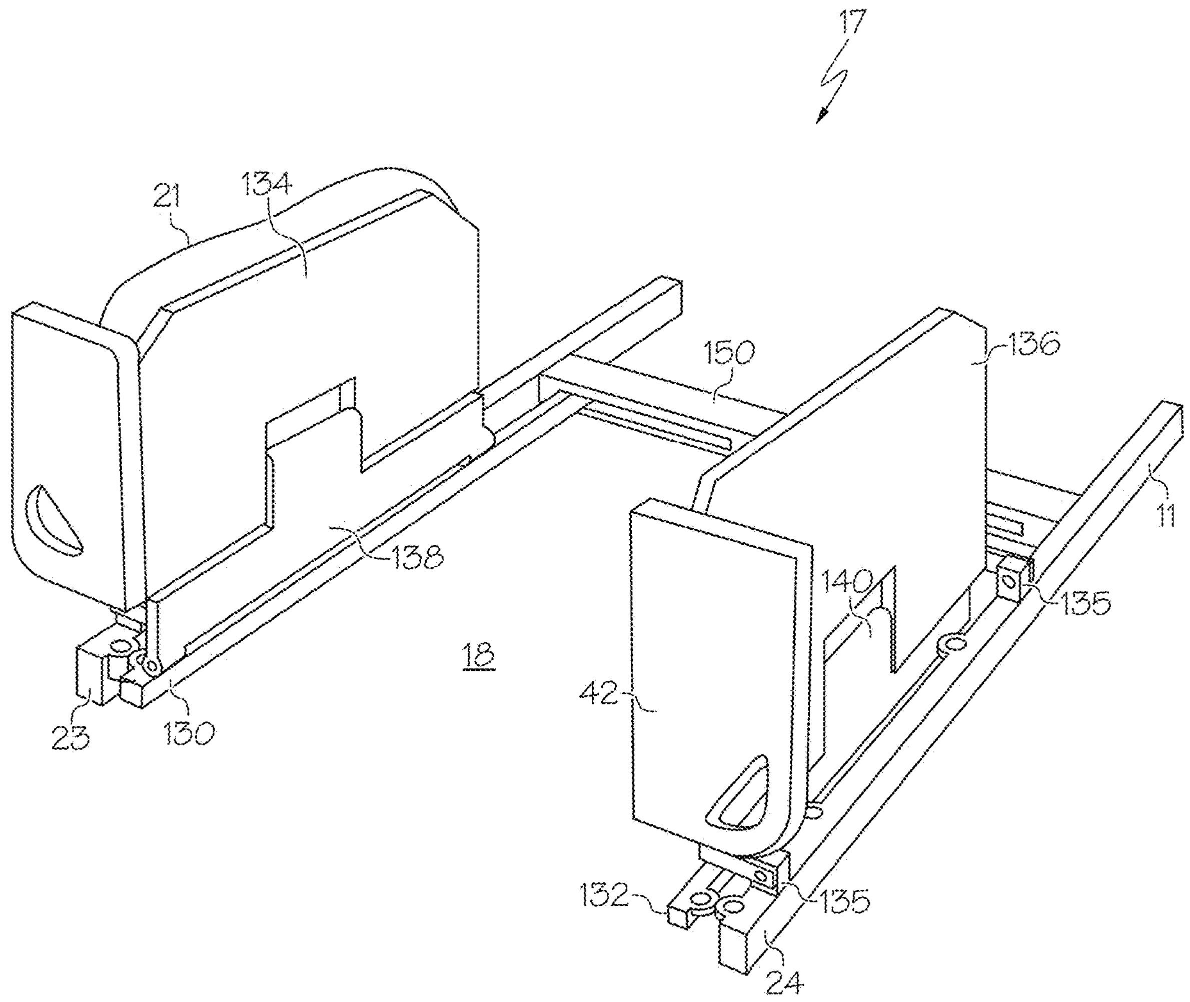
FIG. 11 illustrates the support bars of the embodiment of FIG. 8 in the fully retracted position.

As illustrated in FIGS. 8-12, this new embodiment of the invention includes dual support bars 130, 132, one each for supporting the foot panels 21, 22 from below when they are in the horizontal position. Instead of a single crossbar (20, as shown in FIGS. 1, 2, 4A, 5 and 6) spanning the clearing 18 between the lateral rails 23, 24 and retracting towards the seat section 16 of the bed, the dual support bars 130, 132 are slidably or otherwise movably connected to a crossbeam 150 of the bed frame 11 and retract laterally, towards their respective lateral rails 23, 24. In addition, as can be seen in FIGS. 10 and 11, lateral retraction of the support bars 130, 132 towards their respective lateral rails 23, 24 serves to lift and upwardly rotate each foot panel 21, 22. When the support bars 130, 132 are retracted, each support hinge (described below) is caused to pivot and fold upward, which in turn causes the respective foot panels 21, 22 to rotate upward.

FIGS. 8-10 illustrate the foot section 17 of the new embodiment of the hospital bed in which dual support bars 130, 132 provide individual support for their respective foot panels 21, 22. In FIG. 8, a planar linkage system including control arms 131 and slidable pivoting arms 133 connects each of the dual support bars 130, 132 to their lateral rails 23, 24, and provides alignment and support for the support bars 130, 132 as they slide along their connection to the crossbeam 150 of the bed frame 11. The crossbeam 150 is generally located beneath the seat section 16 of the bed, and is situated substantially perpendicularly between and spans the distance between the first and second lateral rails 23, 24 of the bed frame 11. In FIG. 9 a pair of lifting segments 138 and 140 are included, showing their connection to their respective support bars 130, 132; and in FIG. 10 deck portions 134 and 136 are also included, showing their coupled connections to the lifting segments 138, 140 and the lateral rails 23, 24. Each deck portion 134, 136, in addition to being pivotally connected to a corresponding lifting segment 138, 140, is also coupled to and supports a corresponding foot panel, such as foot panel 21 shown in FIG. 11. FIG. 11 also illustrates foot boards 41, 42, which are described in more detail, above.

Figure 12:
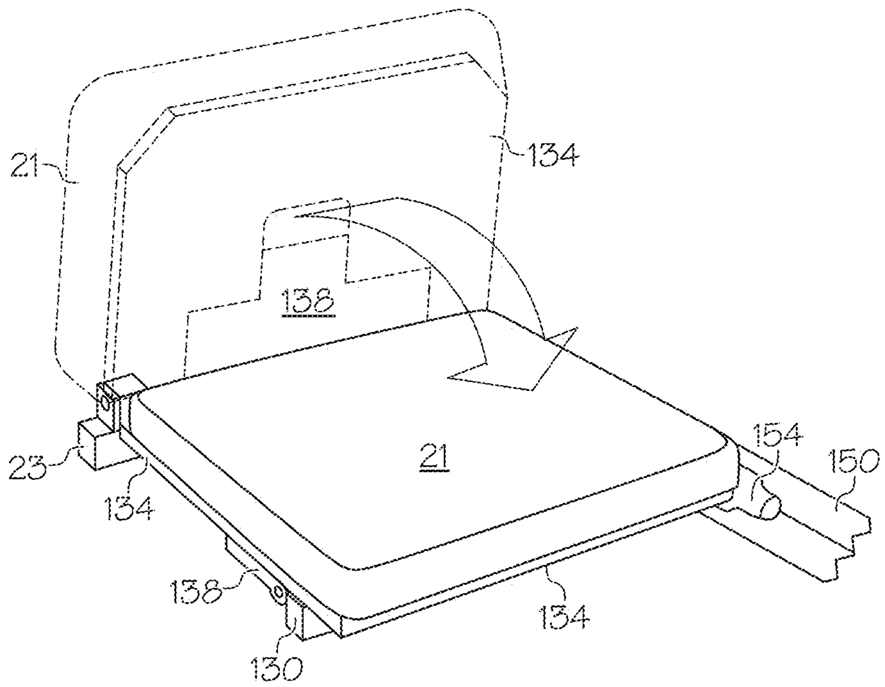
FIG. 12 illustrates the first foot panel after moving along the arrow direction from the substantially upright, vertical position to the horizontal position, with its support bar shown in the fully extended position.

Each of the dual support bars 130, 132 are movably connected at one end to the crossbeam 150, and each support bar can slide along the plane of the crossbeam a distance between the midline of the crossbeam (i.e. a fully "extended" position) and its respective lateral rail (i.e. a fully "retracted" position). FIGS. 8-10 illustrate the support bars 130, 132 in a semi-extended position between the lateral rails 23, 24. In contrast, FIG. 11 illustrates the support bars 130, 132 in the fully retracted position, with the deck portions 134, 136 and their corresponding foot panels 21 (and 22, not shown) in the substantially upright, vertical position, and with each support bar 130, 132 next to or otherwise abutting its corresponding lateral rail 23, 24. FIG. 12 shows the first foot panel 21 after moving along the arrow direction from the substantially upright, vertical position to the horizontal position, with its support bar 130 shown in the fully extended position.

When both support bars 130, 132 are fully extended, they are next to or otherwise substantially abut one another at the midway point of the crossbeam 150, which corresponds to the midline of the clearing 18, each support bar providing a deck portion 134/136 to help support its respective horizontal foot panel 21, 22. When the dual support bars 130, 132 are retracted from the midline of the crossbeam 150 towards their respective lateral rails 23, 24, the coupled lifting segments 138, 140, via their hinged connection 139 to their respective deck portions 134, 136 (see FIG. 10), cause the deck portions 134, 136 to be lifted vertically and their respective foot panels to be rotated upward. As a result, the foot panels 21, 22 will be pivoted to their substantially upright, vertical position to expose the clearing 18; see FIG. 11.

As noted above, the dual support bars 130, 132 are movable between a retracted position, in which they substantially abut their respective lateral rails 23, 24 (see FIG. 11), and an extended position in which they support their respective horizontal foot panels 21, 22 above and substantially abut one another at the midline of the crossbeam 150 (see FIG. 12). As best seen in FIG. 8, a single control arm 131 and two slidable pivoting arms 133 are associated with each of the first support bar 130 and the second support bar 132, such that one control arm 131 and two pivoting arms 133 connect each of the sliding support bars 130, 132 to their respective slotted lateral rails 23, 24 of the bed frame 11. In addition to being linked to their lateral rails, each support bar 130, 132 is also connected substantially perpendicularly to the slotted crossbeam 150 of the bed frame 11. As illustrated by the arrows in FIG. 8, the slots in the crossbeam 150 and lateral rails 23, 24 allow the linkage system to move each support bar 130, 132 back and forth. The control arms 131 and pivoting arms 133 serve to keep the support bars 130, 132 in the same horizontal plane as they slide between the extended position and the retracted position. The support bars 130, 132 can be manually actuated, or they can be powered by small drive motor located within the in the crossbeam 150, for example motor 154 (see FIG. 12).

Each of the dual support bars 130, 132 is pivotally connected to and controls a “support hinge” for raising their respective foot panel, 21, 22. As illustrated in FIGS. 9-11, each support hinge contains a deck portion 134/136 hingedly connected to a lifting segment 138/140. Together, each deck portion/lifting segment pair (134/138 and 136/140) constitutes a support hinge which can be “folded” and “unfolded”. Specifically, the first support bar 130, which is connected to the first lateral rail 23 by control arm 131 and slidable pivoting arms 133, is positioned under and hingedly connected to a corresponding first lifting segment 138, and the second support bar 132 is positioned under and hingedly connected to a corresponding second lifting segment 140. Each of the lifting segments 138, 140 includes a tongue 139 located substantially in the center of its upper edge, and each tongue 139 is hingedly attached, for example by a pin, to the center of a corresponding deck portion 134 or 136. As best seen in FIG. 10, the lateral corners of each deck portion 134, 136 are attached by a pair of offset hinges 135 to their corresponding lateral rail 23, 24, such that the deck portions 134, 136 are rotated upwards and lifted when the lifting segments 138, 140 are caused to move via their hinged connections to the support bars 130, 131.

Movement of either of the support bars 130, 132, either simultaneously or sequentially, causes movement of their respective lifting segments 138, 140, which causes upward movement of their respective deck portions 134, 136. For example, the first deck portion 134, which is pivotally connected to the first lateral rail 23 by an offset hinge 135, also carries the first foot panel 21, such that when the first deck portion 134 is caused to pivotally rotate upwards by movement of the first support bar 130 towards the first lateral rail 23, the foot panel 21 will follow. The above description is also true for the second support bar 132. Thus when the support hinges (i.e. each deck portion/lifting segment pair, 134/138 and 136/140) are folded, the foot panels 21, 22 are rotated upward to their substantially vertical position (see FIG. 11), and when the support hinges are unfolded the foot panels are returned to their horizontal, co-planar position (see FIG. 12).

The first deck portion 134 and the first lifting segment 138 of the first foot panel 21 can initially be in a horizontal, co-planar orientation with one another, and with their corresponding second deck portion 136, second lifting segment 140 and second foot panel 22, such as when the patient is laying on the bed with their feet resting on the foot panels. In this bed configuration, structural support for each of the foot panels is provided by the dual support bars 130, 132 in combination with their respective support hinges (i.e. deck portion/lifting segment pairs 134/138 and 136/140). The lifting segment 138, 140 of each support hinge can then be caused to move or otherwise be controlled by its respective sliding support bar 130, 132, as illustrated in FIG. 9. The dual support bars 130, 132 can be actuated by a motor 154 in the horizontal plane of the crossbeam 150 to move from a fully retracted position next to the lateral rails, as illustrated in FIG. 11, to a fully extended position near the middle of the crossbeam 150, as illustrated in FIG. 12. Typically the deck portion/lifting segment pairs 134/138 and 136/140 will fold or pivot vertically upward, as illustrated.

Each deck portion 134, 136 is typically larger in mass than its corresponding lifting segment 138, 140, and the support provided by the support bars 130, 132 in combination with the deck portions 134, 136 (as well as the smaller lifting segments 138, 140) are intended to be manufactured of materials that can safely support a predetermined amount of weight placed upon it. For example, the dual support bars with their deck portions should be able to support the patient’s feet, as well as someone sitting on the foot panels 21, 22, when the foot panels are in the horizontal configuration. Folding of the deck portion/lifting segment pairs 134/138 and 136/140 in combination with the retraction of the dual support bars 130, 132 towards the lateral rails 23, 24 in turn lifts or otherwise causes the foot panels 21, 22 to rotate upward about their pivoted connection with the lateral rails 23, 24, into the vertical position, exposing the clearing 18 for egress from the foot of the bed. The vertical foot panels then can be locked into place to support the patient with standing, as described earlier in this disclosure.

The motor(s) 154 in the crossbeam 150 which can activate the dual support bars 130, 132 can be programmed to operate the support bars simultaneously, or consecutively. For example, it may be determined that for safety reasons the foot panels 21, 22 should be raised consecutively, or in succession, such as when a patient is laying in the hospital bed with the foot panels in the horizontal, co-planar relationship (i.e. the bed configuration, as described above). Prior to raising the first panel 21, the patient can first move their feet onto the second foot panel 2. In the embodiment illustrated in FIGS. 8-12, the first support bar 130 can then be retracted or otherwise moved towards the first lateral rail 23, causing the first foot panel 21 to be upwardly rotated. Once the first foot panel 21 is raised (and then preferably locked) into a substantially vertical position, the patient can then sit up and place both feet on the ground prior to the second support bar 132 being retracted towards the second lateral rail 24, which causes the second foot panel 22 to be upwardly rotated (and then preferably locked) into a substantially vertical position, fully exposing the clearing 18.

Notably, with the embodiment illustrated in FIGS. 8-12 and described above, each of the first foot panel 21 and the second foot panel 22 is still fully supported from below by its own dedicated support bar 130, 132; this is in contrast to the initial embodiments shown in FIGS. 1-7 and described above, in which the single crossbar 20 spans the clearing between the lateral rails and is first retracted inward towards the seat section 16 of the bed and therefore removed from under both of the foot panels prior to raising them, thus leaving the foot panels 21, 22 vulnerable to damage, and possibly leading to patient or bystander injury.

While the embodiment illustrated in FIGS. 8-12 and described above is described as being driven by a motor, it is also understood that alternative embodiments can include dual support bars which are manually operated. For example, in one embodiment, simple manual lifting and locking of the foot panels into their vertical position will cause the interconnected dual support bars to also be retracted to expose the clearing. In addition, it is noted that embodiments are envisioned in which electronic control of the drive motor(s) for operating the foot panels can be by push buttons on the bed, or via a remote control, which can be operated by the patient, the nurse, or hospital personnel, in either a hospital setting or in a home setting.

The present invention provides an improved hospital bed which advantageously makes it easier for patients to go from laying to sitting, and from sitting to standing, and also provides an improved manner of ingress/egress. It can be useful not only in the acute post-operative care setting, but in long-term care facilities, as well as in home health care settings. The clearing created at the foot of the bed can be useful for nurses when helping patients such as the fragile, obese, or incontinent to get into and out of the bed, without the risk of falling that is attributable to conventional hospital beds. The clearing can also provide a space to maneuver a scale, a bedside toilet, physical therapy equipment such as a walker, a wheelchair, or a mobile treadmill. Use of a conventional overbed table, also known as a bed table or a tilt top table, is also made much easier and safer.

Overbed tables are intended to provide a steady surface while laying in a hospital bed, for example, for a patient to eat on or do office work on. The combination of the inventive bed with an overbed table can allow the patient to safely be seated at the foot of the bed while eating, with their feet safely on the floor, as opposed to having to lay in bed or sit at the side of the bed. For example, an overbed table can be safely loaded and locked in place by the lateral rails within the clearing at the distal foot end of the bed. In addition, when the patient is sitting in the clearing, the conventional guard rails do not need to be lowered to receive the overbed table, as required when the patient is sitting up in a conventional hospital bed. Also, the patient can sit up and eat without the side guard rails having to be lowered and the patient's legs dangled over the side of the bed. This is advantageous because often the guard rails are not restored to their upright position with convention overbed table use, leading to falls and injuries. Not having to lower the guard rails at all removes this risk.

The clearing provided by the inventive bed can also provide a space to maneuver a novel stretcher. For example, existing bed-to-bed transfer of hospitalized patients is currently performed by sliding the patient sideways from one bed to the other as they are locked in position next to one another. This universally used transfer method is commonly known to result in sometimes devastating injuries to both patients and hospital staff. However, with the novel upwardly rotating foot panels exposing the clearing, as described herein, it is envisioned that a novel stretcher can be manufactured to match the clearing, such that it can be wheeled or otherwise slid into the clearing and the patient can be easily transferred from the stretcher to the bed. As a non-limiting example, this can be done by sliding and overlaying the incoming stretcher over the patient support surface of the bed in a cantilevered orientation. The stretcher can then be slightly tilted and a draw sheet under the patient can be held stationary while the stretcher is removed, thereby safely sliding the patient onto the bed surface.

While the present invention has been illustrated by the description of embodiments and examples thereof, it is not intended to restrict or in any way limit the scope of the appended claims to such details. Additional advantages and modifications will be readily apparent to those skilled in the art. Accordingly, departures may be made from such details without departing from the scope of the invention.

What is claimed is:

1. An improved bed having foot egress, the bed comprising:

a) a frame including a first lateral rail and a second lateral rail;

b) a patient support surface supported by the frame, the support surface including:

i) a back section;

ii) a seat section; and iii) a foot section, the foot section comprising a first foot panel pivotably connected to the first lateral rail and a second foot panel pivotably connected to the second lateral rail, wherein the first foot panel and second foot panel are each upwardly pivotable through their connection with the first and second lateral rails, respectively, from a horizontal position in which the first and second foot panels are in a substantially co-planar relationship to a vertical position in which the first and second foot panels are in a substantially parallel relationship, and wherein a clearing for egress from the bed is exposed when the first foot panel and the second foot panel are in the vertical position;

wherein the improvement comprises:

c) a crossbeam connected perpendicularly between the first lateral rail and the second lateral rail of the frame, wherein the crossbeam is located beneath the seat section of the patient support surface;

d) a first support bar for supporting the first foot panel, the first support bar being slidably connected to the crossbeam for movement back and forth between the first lateral rail and the midline of the crossbeam, wherein movement of the first support bar towards the first lateral rail causes the first foot panel to lift and upwardly pivot to the vertical position, and wherein movement of the first support bar towards the midline of the crossbeam causes the first foot panel to pivot to the horizontal position; and e) a second support bar for supporting the second foot panel, the second support bar being slidably connected to the crossbeam for movement back and forth between the second lateral rail and the midline of the crossbeam, wherein movement of the second support bar towards the second lateral rail causes the second foot panel to lift and upwardly pivot to the vertical position, and wherein movement of the second support bar towards the midline of the crossbeam causes the second foot panel to pivot to the horizontal position.

2. The improvement of claim 1, wherein the first support bar and the second support bar are connected to their respective lateral rails by at least one slidable pivoting arm and a control arm.

3. The improvement of claim 1, wherein the first support bar is pivotally connected to a first support hinge for lifting and upwardly pivoting the first foot panel to the vertical position, and wherein the second support bar is pivotally connected to a second support hinge to lift and upwardly pivot the second foot panel to the vertical position.

4. The improvement of claim 3, wherein each support hinge folds and each foot panel pivots upward upon movement of their respective support bar towards its respective lateral rail.

5. The improvement of claim 3, wherein the first support hinge includes a first deck portion hingedly connected to a first lifting segment, the first support bar being positioned under and pivotally connected to the first lifting segment, wherein the second support hinge includes a second deck portion hingedly connected to a second lifting segment, the second support bar being positioned under and pivotally connected to the second lifting segment, wherein each of the first and second lifting segments includes a tongue located substantially in the center of its upper edge, wherein the tongue of the first lifting segment is hingedly attached to the first deck portion and the tongue of the second lifting segment is hingedly attached to the second deck portion, and wherein the first deck portion is attached by a pair of offset hinges to the first lateral rail and the second deck portion is attached by a pair of offset hinges to the second lateral rail.

6. The improvement of claim 1, wherein the first support bar and the second support bar are powered by a motor located within the crossbeam of the frame.

7. The improvement of claim 6, wherein the motor is programmable to actuate the first and second support bars either simultaneously or consecutively.

8. The improvement of claim 1, wherein the first foot panel and the second foot panel are configured to lock into place after being pivoted to the vertical position.

9. The improvement of claim 1, wherein the first foot panel and the second foot panel each include a grab handle for assistance in standing and ambulation.

10. An improved bed having foot egress, the bed comprising:

a) a frame including a first lateral rail and a second lateral rail;

b) a patient support surface coupled to the frame and including a seat section and a foot section, the foot section comprising a first foot panel and a second foot panel, wherein each of the first foot panel and the second foot panel are pivotable from a horizontal position to a vertical position to expose a clearing for egress from the bed;

c) a crossbeam connected perpendicularly between the first lateral rail and the second lateral rail, wherein the crossbeam is located beneath the seat section of the patient support surface;

d) a first support bar for supporting the first foot panel, the first support bar being slidably connected to the crossbeam for movement between the first lateral rail and the midline of the crossbeam, wherein movement of the first support bar towards the first lateral rail causes the first foot panel to pivot to the vertical position, and wherein movement of the first support bar towards the midline of the crossbeam causes the first foot panel to pivot to the horizontal position; and e) a second support bar for supporting the second foot panel, the second support bar being slidably connected to the crossbeam for movement between the second lateral rail and the midline of the crossbeam, wherein movement of the second support bar towards the second lateral rail causes the second foot panel to upwardly pivot to the vertical position, and wherein movement of the second support bar towards the midline of the crossbeam causes the second foot panel to pivot to the horizontal position.

11. The improvement of claim 10, wherein the first support bar and the second support bar are connected to their respective lateral rails by at least one slidable pivoting arm and a control arm.

12. The improvement of claim 10, wherein the first support bar is pivotally connected to a first support hinge for lifting and upwardly pivoting the first foot panel to the vertical position, and wherein the second support bar is pivotally connected to a second support hinge to lift and upwardly pivot the second foot panel to the vertical position.

13. The improvement of claim 12, wherein each support hinge folds and each foot panel pivots upward upon movement of their respective support bar towards its respective lateral rail.

14. The improvement of claim 12, wherein the first support hinge includes a first deck portion hingedly connected to a first lifting segment, the first support bar being positioned under and pivotally connected to the first lifting segment, wherein the second support hinge includes a second deck portion hingedly connected to a second lifting segment, the second support bar being positioned under and pivotally connected to the second lifting segment, wherein each of the first and second lifting segments includes a tongue located substantially in the center of its upper edge, wherein the tongue of the first lifting segment is hingedly attached to the first deck portion and the tongue of the second lifting segment is hingedly attached to the second deck portion, and wherein the first deck portion is attached by a pair of offset hinges to the first lateral rail and the second deck portion is attached by a pair of offset hinges to the second lateral rail.

15. The improvement of claim 10, wherein the first support bar and the second support bar are powered by a motor located within the crossbeam of the frame.

16. The improvement of claim 15, wherein the motor is programmable to actuate the first and second support bars either simultaneously or consecutively.

17. The improvement of claim 10, wherein each of the first foot panel and the second foot panel is configured to lock into place after being pivoted to the vertical position.

18. The improvement of claim 10, wherein each of the first foot panel and the second foot panel include integrated heel supports for placement and securement of the patient's feet when the panels are in the vertical position.

* * * * *